United States Patent [19]

Matsumi et al.

[11] Patent Number: 5,311,372
[45] Date of Patent: May 10, 1994

[54] METHOD OF RECORDING DIGITAL SIGNALS IN AN INTERLEAVING ARRAY FORM WITH ENHANCED ERROR INTERPOLATION

[75] Inventors: Chiyoko Matsumi, Suita; Susumu Yamaguchi, Moriguchi; Akira Iketani, Higashiosaka; Tatsuro Juri, Osaka, all of Japan

[73] Assignee: Matsushita Electric Industrial Co., Ltd., Osaka, Japan

[21] Appl. No.: 722,674

[22] Filed: Jun. 28, 1991

[30] Foreign Application Priority Data

Jun. 29, 1990 [JP] Japan ................... 2-173430
Aug. 8, 1990 [JP] Japan ................... 2-211049

[51] Int. Cl.$^5$ ............ G11B 20/12; G11B 5/02
[52] U.S. Cl. ...................... 360/19.1; 360/22
[58] Field of Search ........... 360/18, 19.1, 22, 27; 369/85; 380/14, 19

[56] References Cited

U.S. PATENT DOCUMENTS

| | | | |
|---|---|---|---|
| 4,353,098 | 10/1982 | Heinz et al. | 360/19.1 |
| 4,459,611 | 7/1984 | Arai et al. | 380/14 |
| 4,646,170 | 2/1987 | Kobayashi et al. | 360/22 |
| 4,768,108 | 8/1988 | Higurashi | 360/27 |
| 4,852,102 | 7/1989 | Yamaguchi | 360/19.1 |
| 4,989,102 | 1/1991 | Murabayashi et al. | 360/27 |
| 5,043,830 | 8/1991 | Nobuhiro | 360/19.1 |

FOREIGN PATENT DOCUMENTS

| | | |
|---|---|---|
| 0335273A2 | 10/1989 | European Pat. Off. |
| 0371717A2 | 6/1990 | European Pat. Off. |
| 0397472A2 | 11/1990 | European Pat. Off. |
| 3918454A1 | 12/1989 | Fed. Rep. of Germany |
| 55-162676 | 12/1980 | Japan |
| 56-144682 | 11/1981 | Japan |
| 2220521A | 1/1990 | United Kingdom |

*Primary Examiner*—Edward P. Westin
*Assistant Examiner*—Benjamin D. Driscoll
*Attorney, Agent, or Firm*—Wenderoth, Lind & Ponack

[57] ABSTRACT

In a method of recording digital signals, in which all audio signals of N channels (N=integer) are recorded on M tracks (M=integer>N) where video signals of I fields (I=integer) are recorded, the improvement including: the M tracks being divided into N track groups each having S tracks (S=integer=M/N) arranged successively such that the audio signals of a j-th channel (j=integer) in the N channels are recorded on the tracks of an i-th track group (i=integer) in the N track groups.

19 Claims, 10 Drawing Sheets

METHOD OF RECORDING DIGITAL SIGNALS IN AN INTERLEAVING ARRAY FORM WITH ENHANCED ERROR INTERPOLATION

BACKGROUND OF THE INVENTION

The present invention relates to a method of recording digital video and audio signals.

In comparison with a conventional analog recording type video tape recorder (hereinbelow, referred to as an "AVCR"), the reproduced image quality and reproduced sound quality are more excellent in a digital recording type video tape recorder (hereinbelow, referred to as a "DVCR") in which video and audio signals are recorded digitally. D1-format is one example of formats of DVCRs, a small number of which are put to practical use. As shown in FIG. 1, a D1-format tape has linear tracks on its opposite sides, such as an analog audio cue track AT for recording audio references, a control track CT for recording tracking control signals and a time code track TT for recording time codes and user's data. These linear tracks are provided for improving efficiency of editing.

Meanwhile, between the linear tracks, the D1-format tape has a plurality of helical tracks acting as signal tracks ST, respectively, two of which are illustrated in FIG. 1. Each signal track ST is constituted by two video bursts V for recording video signals, four audio bursts A interposed between the video bursts V, five gaps G among the video bursts V and the audio bursts A and two ambles B for interposing the video bursts V therebetween. Even and odd components of each audio channel are recorded on these four audio bursts A. Namely, in the case of 4-channel audio data, signal tracks 1 to 4 form one unit for recording 4-channel audio data and 4-channel audio data are recorded by repeating sequence of the signal tracks 1 to 4 as follows:

| Track 1: | Ch 1 - Even, | Ch 4 - Odd, | Ch 3 - Even, | Ch 2 - Odd, |
|---|---|---|---|---|
| Track 2: | Ch 2 - Even, | Ch 1 - Odd, | Ch 4 - Even, | Ch 3 - Odd, |
| Track 3: | Ch 3 - Even, | Ch 2 - Odd, | Ch 1 - Even, | Ch 4 - Odd, |
| Track 4: | Ch 4 - Even, | Ch 3 - Odd, | Ch 2 - Even, | Ch 1 - Odd. |

In the above, "Ch" denotes a channel. D1-format is used for broadcasting and therefore, should have sufficiently high image and sound quality. Thus, luminance components and color difference components of video signals have sampling frequencies of 13.5 MHz and 6.75 MHz, respectively. Meanwhile, audio signals have a single sampling frequency of 48 kHz which is phase locked to the sampling frequencies of the video signals.

In VCRs for broadcasting use, it is essential to perform complete and independent editing. However, it is not guaranteed that a mechanical accuracy of 100% cannot be achieved even in VCRs for broadcasting use. Namely, for example, in the case where an already recorded audio burst is rewritten at the time of editing, it is impossible to record new signals at locations completely identical with those of the original audio burst. Therefore, if a guard between neighboring signal tracks or the gaps are not provided, the audio bursts adjacent to the audio burst to be rewritten are disturbed by rewriting, thereby resulting in an increase of errors at the time of reproduction. In VCRs for broadcasting use, such deterioration in the quality of recording signals is not permitted. On the above mentioned ground, the gaps and the guards are set at sufficiently large values in order to prevent the deterioration in the quality of recorded data.

To this end, the D1-format tape has a width of 19 mm, a maximum length of 1,600 m (maximum recording time of 94 min.). Furthermore, a tape cassette for the D1-format tape is far larger than a commercially available tape cassette for a ½-inch tape of a maximum recording time of 480 min. However, in broadcasting, greater importance is attached to editing performance than the large size of the tape cassette and the short recording time. In other words, in order to improve editing performance of the D1-format tape, additional areas which are not used for recording, such as the gaps and the guards are required to be provided even at the sacrifice of the recording time.

On the other hand, in order to put DVCRs for home use to practical use, longer recording time, smaller cassette size and higher reproduced image and sound quality than those of current AVCRs for home use are demanded. Therefore, known D1-format DVCRs for home use have drawbacks (1) and (2).

(1) Since the tape has excessively large additional areas which are not used for recording data, its recording time becomes short.

(2) Since the tape has too many linear tracks for editing, it is impossible to reduce the width of the tape.

Thus, in the known D1-format DVCRs for home use, there has been a keen demand for securing permissible reproduction quality for editing through elimination of the above mentioned drawbacks.

SUMMARY OF THE INVENTION

Accordingly, an essential object of the present invention is to provide a method of recording digital signals, which is optimum for recording audio signals by using a plurality of tracks for each channel without employing any guard.

In order to accomplish this object of the present invention, when the audio signals of N channels are recorded synchronously with the video signals in the present invention, the audio signals of each channel corresponding to a period of I fields (I=integer) of the video signals are recorded on the successive tracks, respectively without providing any guard. Namely, the audio signals of channel "1" are recorded on a track group 1 of a plurality of successive tracks and the audio signals of channel "2" are recorded on a track group 2 of plurality of successive tracks. Likewise, the audio signals of channel "N" are recorded on a track group N of a plurality of successive tracks. As a result, even if a guard between the neighboring tracks is not provided, the number of audio signals damaged by editing can be lessened and thus, reproduced sound quality falling within a permissible range through error correction can be obtained.

In addition to the above described arrangement, each track is divided into a video signal portion and an audio signal portion and the audio signal portion is divided into K synchronous blocks such that L synchronous blocks of the K synchronous blocks are allotted to audio signal data, while the remaining (K-L) synchronous blocks are allotted to error correction and check codes, with the L synchronous blocks being, respectively, provided with areas for recording auxiliary data. For recording the auxiliary data, each of the L synchronous blocks have the same area capacity at the same position in the synchronous block.

For example, user's data, time codes, etc. can be used as the auxiliary data. Thus, these data which have been recorded in the linear tracks in the known D1-format can be stored in the helical tracks. Therefore, the linear tracks for recording such data can be eliminated, thereby resulting in a reduction of the width of the tape.

Meanwhile, when the audio signal data corresponding to the I fields of the video signals are interleaved into an area of the L synchronous blocks in each of the S tracks (S=M/N) in the present invention, the optimum interleaving method in accordance with the video signals is performed.

Furthermore, when audio signals asynchronous with the video signals are recorded, the audio signals sampled during a period of the I fields of the video signals are recorded together with the number of the samples performed during the period of the I fields of the video signals.

By the above described arrangement of the present invention, elimination of the guards enlarges recording time. Furthermore, when the audio signals of the N channels are rewritten independently of each other, errors produced by inaccuracy of a recording mechanism can be reduced and damage to another audio signal is lessened. Even if the audio signals are damaged, optimum interpolation for the damaged audio signals can be performed.

Therefore, the present invention solves a problem in that the known D1-format cannot be applied to the DVCRs for home use and enables long recording and full editing functions, which are essential for the DVTRs for home use.

Meanwhile, by the interleaving method of the above described arrangement, optimum correction and interpolation of errors produced by editing and burst errors can be performed for the audio signals recorded by using a plurality of tracks per channel. In addition, the areas for effectively recording the auxiliary data are secured without using the linear tracks. Moreover, since the number of the samples of the audio signals performed during the period of the I fields of the video signals is made variable, the audio signals asynchronous with the video signals can be recorded and reproduced highly accurately by recording the number of the samples of the audio signals. As described above, the present invention achieves remarkable effects for practical use.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
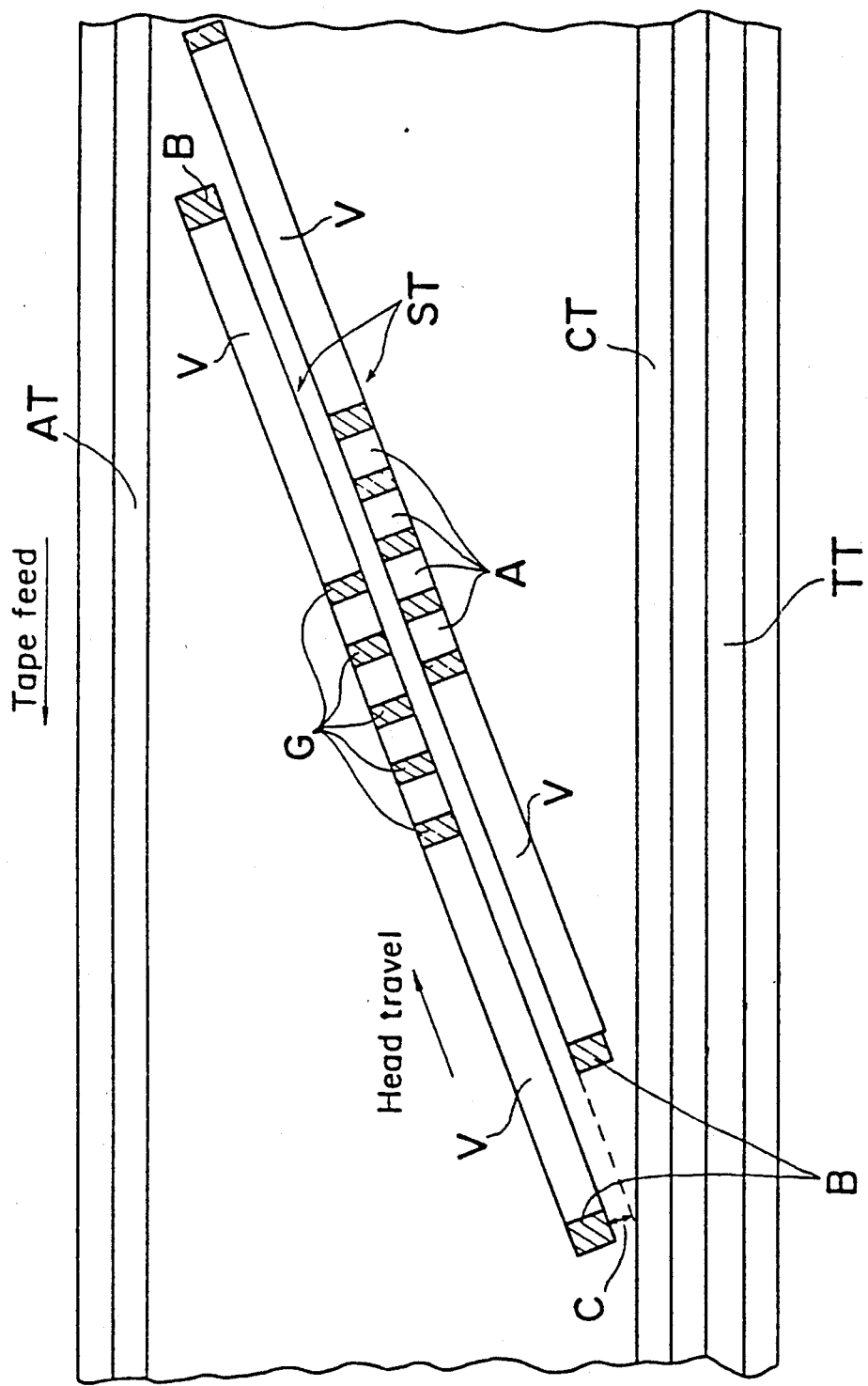
FIG. 1 is a view showing the recording pattern on a prior art tape (already referred to)
Figure 2:
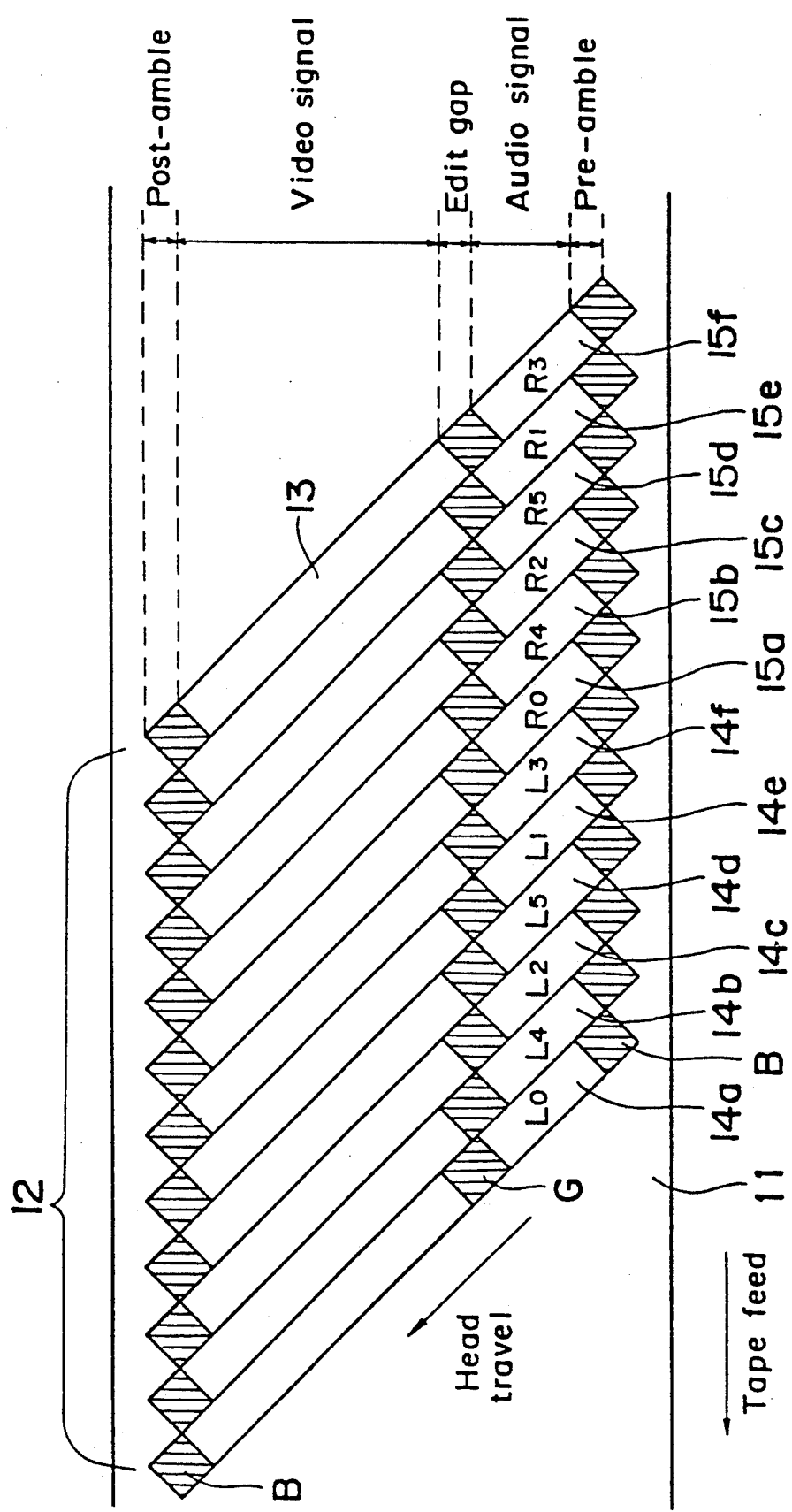
FIG. 2 is a view showing the recording pattern on a tape in a recording method according to a first embodiment of the present invention.

Referring now to the drawings, FIG. 2 shows the recording pattern on a magnetic recording tape 11 in a method of recording digital signals according to a first embodiment of the present invention. In this recording method, one video signal and two audio signals of channels "1" and "2" are recorded as digital signals on the magnetic recording tape 11. The tape 11 has a plurality of helical tracks acting as signal tracks 12, respectively. FIG. 2 shows 12 video bursts 13 provided for recording video signals of one frame. Each signal track 12 has one video burst 13. In the 12 signal tracks 12, six signal tracks 12 have audio bursts 14a, 14b, 14c, 14d, 14e and 14f for channel "1", respectively, while another six signal tracks 12 have audio bursts 15a, 15b, 15c, 15d, 15e and 15f for channel "2", respectively. The audio bursts 14a to 14f and 15a to 15f are used for each audio signal present during a period of one frame of the video signals. Each of the signal tracks 12 is constituted by two ambles B provided at its opposite ends, respectively, the video burst 13, the audio burst 14 or 15 and a gap G disposed between the video burst 13 and the audio burst 14 or 15. At this time, the six audio bursts 14a to 14f are successively disposed on the tape 11, while six audio bursts 15a to 15f are also successively disposed on the tape 11 such that the audio bursts 14a to 14f and 15a to 15f are disposed in this order as shown in FIG. 2.

In the recording method of the above described arrangement, when six values indicative of orders of audio signals of channel "1" on its time base are divided by 6 so as to have remainders of 0, 4, 2, 5, 1 and 3, respectively, the audio signals of channel "1" are allotted to the audio bursts 14a to 14f for channel "1", respectively. Likewise, when six values indicative of orders of audio signals of channel "2" on its time base are divided by 6 so as to have remainders of 0, 4, 2, 5, 1 and 3, respectively, the audio signals of channel "2" are allotted to the audio bursts 15a to 15f for channel "2", respectively. Even if audio signals recorded on the tape 11 are erroneously reproduced over two signal tracks 12 to an uncorrectable degree when this recording method is employed, the erroneous audio signals do not abut each other on the time base. As a result, even if interpolation of the erroneous audio signals is performed, it is possible to prevent interpolation noise from becoming conspicuous.

In the recording method of the above described arrangement, rewriting of the audio signals of only one of channels "1" and "2" is considered. When writing is performed in a state where a recording head deviates from its predetermined position, the signal tracks of a portion of the remaining channel are reduced in width by overwriting and thus, there is a strong possibility that these audio signals cannot be reproduced. Therefore, in the successive signal tracks of neighboring channels, errors will presumably be readily produced in the first and last signal tracks of each channel. Meanwhile, in the case where a recording medium requiring erasure before rewriting is used, there is a strong possibility that if rewriting is performed in a state where the recording head deviates from its predetermined position, signals at overwritten portions cannot be reproduced as the channel for rewriting or the channel not subjected to rewriting. In addition, if erasure is performed in a state where an erase head deviates from its predetermined position in a direction opposite to that of deviation of the recording head, portions where signals cannot be reproduced are further increased in area. Therefore, in the successive signal tracks adjacent the track of neighboring channels, i.e. the first tracks an the last tracks of each channel, many errors occur. By disposing the signals abutting on these two tracks so as not to exist in these two tracks, interpolation noise can be prevented from becoming conspicuous even if interpolation of the errors is performed.

In this embodiment, the audio signals are of two channels. However, the present invention can similarly be applied to audio signals of any number of channels. Meanwhile, channels "1" and "2" are arranged in this order in FIG. 2 but may also be reversed. When further channels are provided, the channels may be arranged in any order. Furthermore, one audio burst 14 or 15 is provided at a leading portion of the signal track 12 and one video burst 13 is disposed rearwards of the audio burst 14 or 15. However, the number of audio burst 14 or 15 and the number of video bursts 13 can be each set to an arbitrary value and the audio bursts and the video bursts may be arranged in any order in each signal track. Meanwhile, the remainders of 0, 4, 2, 5, 1 and 3 for the audio bursts are arranged in this order in FIG. 2 but may be arranged in a different order.

Figure 3:
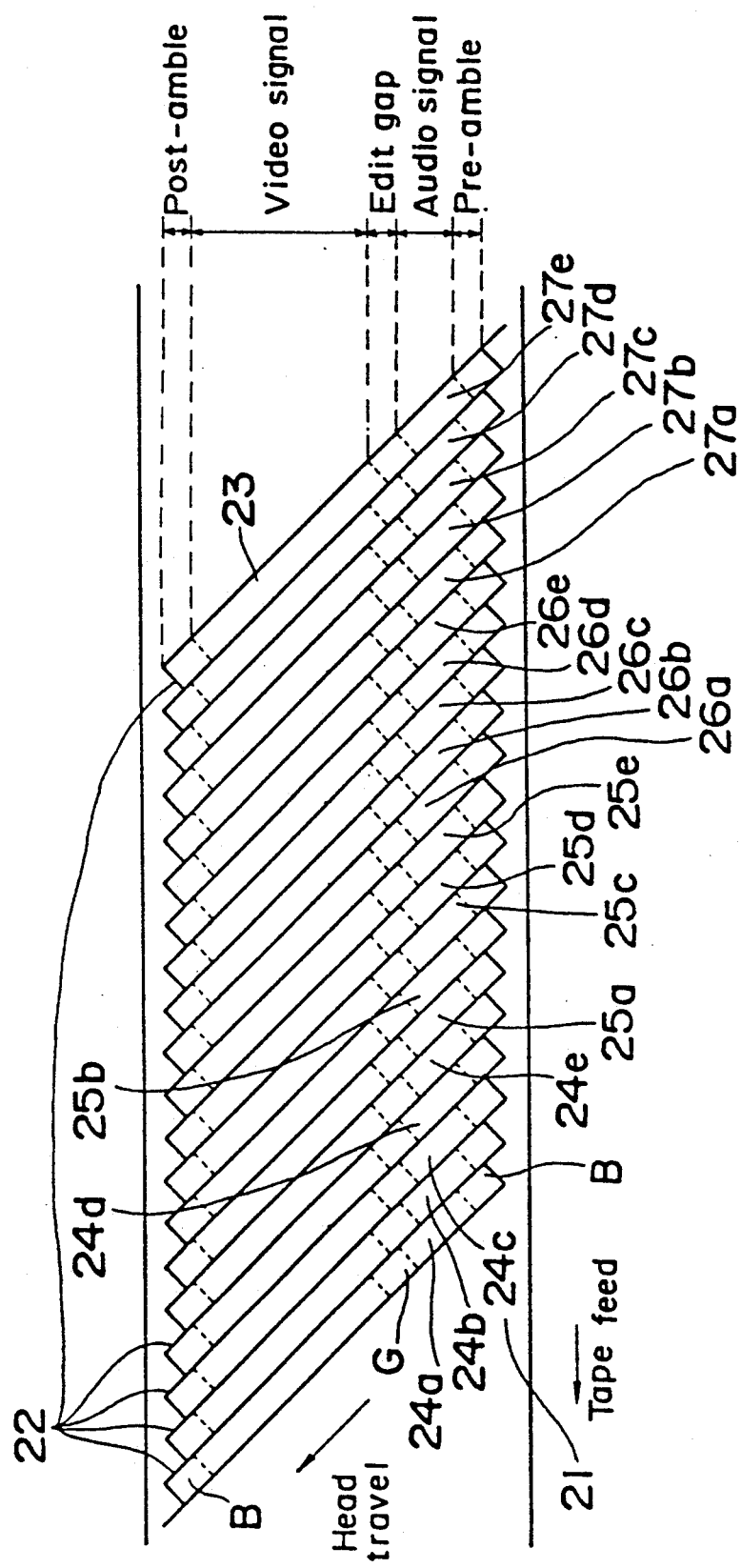
FIG. 3 is a view showing the recording pattern on a tape in a recording method according to a second embodiment of the present invention.

Hereinbelow, a method of recording digital signals, according to a second embodiment of the present invention is described with reference to FIG. 3. In this recording method, one video signal and four audio signals of channels "1", "2", "3" and "4" are recorded as digital signals on a magnetic recording tape 21. The tape 21 has a plurality of helical tracks acting as signal tracks 22, respectively. FIG. 3 shows 20 video bursts 23 provided for recording video signals of two frames. Each signal track 22 has one video burst 23. In the 20 signal tracks 22, a first set of five signal tracks 22 have audio bursts 24a to 24e for channel "1", respectively, a second set of five signal tracks 22 have audio bursts 25a to 25e for channel "2", respectively, a third set of five signal tracks 22 have audio bursts 26a to 26e for channel "3", respectively and a fourth set of five signal tracks 22 have audio bursts 27a to 27e for channel "4", respectively. Each of the signal tracks 22 is constituted by two ambles B provided at its opposite ends, respectively, the video burst 23, the audio burst 24, 25, 26 or 27 and the gap G disposed between the video burst 23 and one of the audio bursts 24 to 27. The audio bursts 24a to 24e, 25a to 25e, 26a to 26e and 27a to 27e are used for each audio signal present during a period of two frames of the video signals. At this time, one set of audio bursts 24a to 24e are successively disposed on the tape 21. Likewise, each of another set of audio bursts 25a to 25e, 26a to 26e and 27a to 27e are successively disposed on the tape 21.

In the recording method of the above described arrangement, if a high efficient coding to a video signal is based on two frames, not only editing of a video signal such as an after-recording or an assembling but also the audio signal processing can be based on two frames. In this case, even if adjacent tracks are damaged due to low accuracy of a recording mechanism at the time of editing, three valid tracks remain and thus, interpolation can be performed excellently.

In the second embodiment of the present invention, the audio signals are of 4 channels. However, the present invention can be likewise applied to audio signals of any number of channels. Meanwhile, channels "1" and "2" are arranged in this order but may also be reversed. Furthermore, channels "3" and "4" may also be arranged in any order. Furthermore, one audio burst is provided at a leading portion of the signal track and one video burst follows the audio burst. However, the number of video bursts and the number of audio bursts can be each set to an arbitrary value and the video bursts and the audio bursts can be arranged in any order. If the number of the tracks required for recording video signals of two frames, processing unit of audio signals is set to one field or one frame and track groups are allotted in the period of one field or one frame, respectively, whereby the same effects as described above can be obtained.

Then, an arrangement of recording tracks 31 employed in a method of recording digital signals, according to a third embodiment of the present invention is described with reference to FIG. 4. The recording tracks 31 are formed by a recording head. Each recording track 31 is constituted by a pre-amble 32, a video signal portion 33, an edit gap 34, an audio signal portion 35 and a post-amble 36.

When both video signals of one channel and audio signals of two (N=2) channels are recorded, 10 (M=10>N) video signal portions 33 of the recording tracks 31 arranged successively in the tape feed direction are used to record one frame video data (I=2) in the case of 525-line/60-field system of a TV format such as the NTSC format, (hereinbelow, referred to as the "525 system"). Meanwhile, in the case, of 625-line/50-field system of such TV format as PAL.SECAM, format (hereinbelow, referred to as the "625 system"), 12 (M=12) video signal portions 33 are used to record one frame video data. Meanwhile, in 525 and 625 systems, five and six audio signal portions 35 arranged successively in the tape feed direction are, respectively, used to record each channel of audio data which was sampled in a video frame duration.

Figure 4:
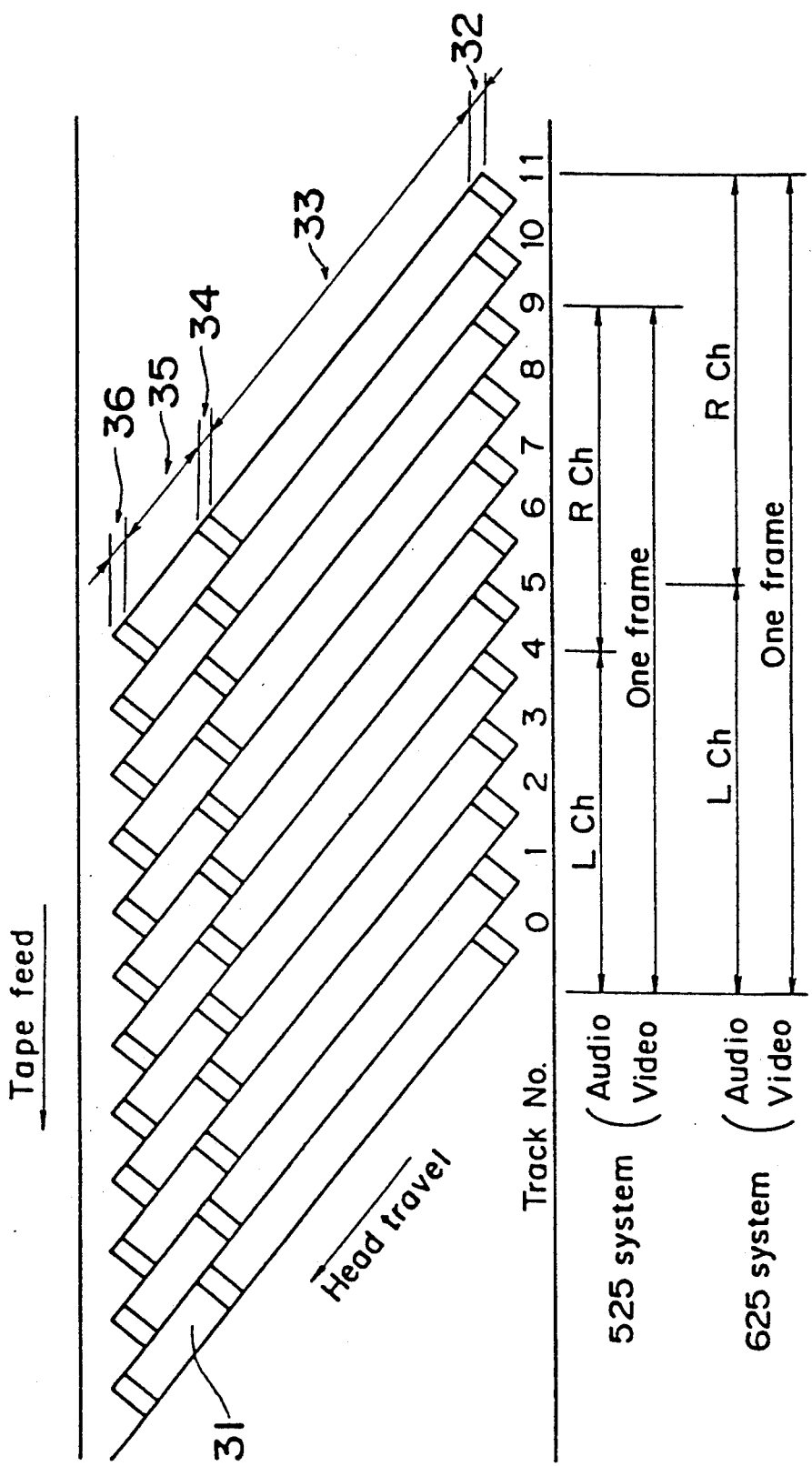
FIG. 4 is a view showing the pattern of recording tracks on a tape in a recording method according to a third embodiment of the present invention.
Figure 5:
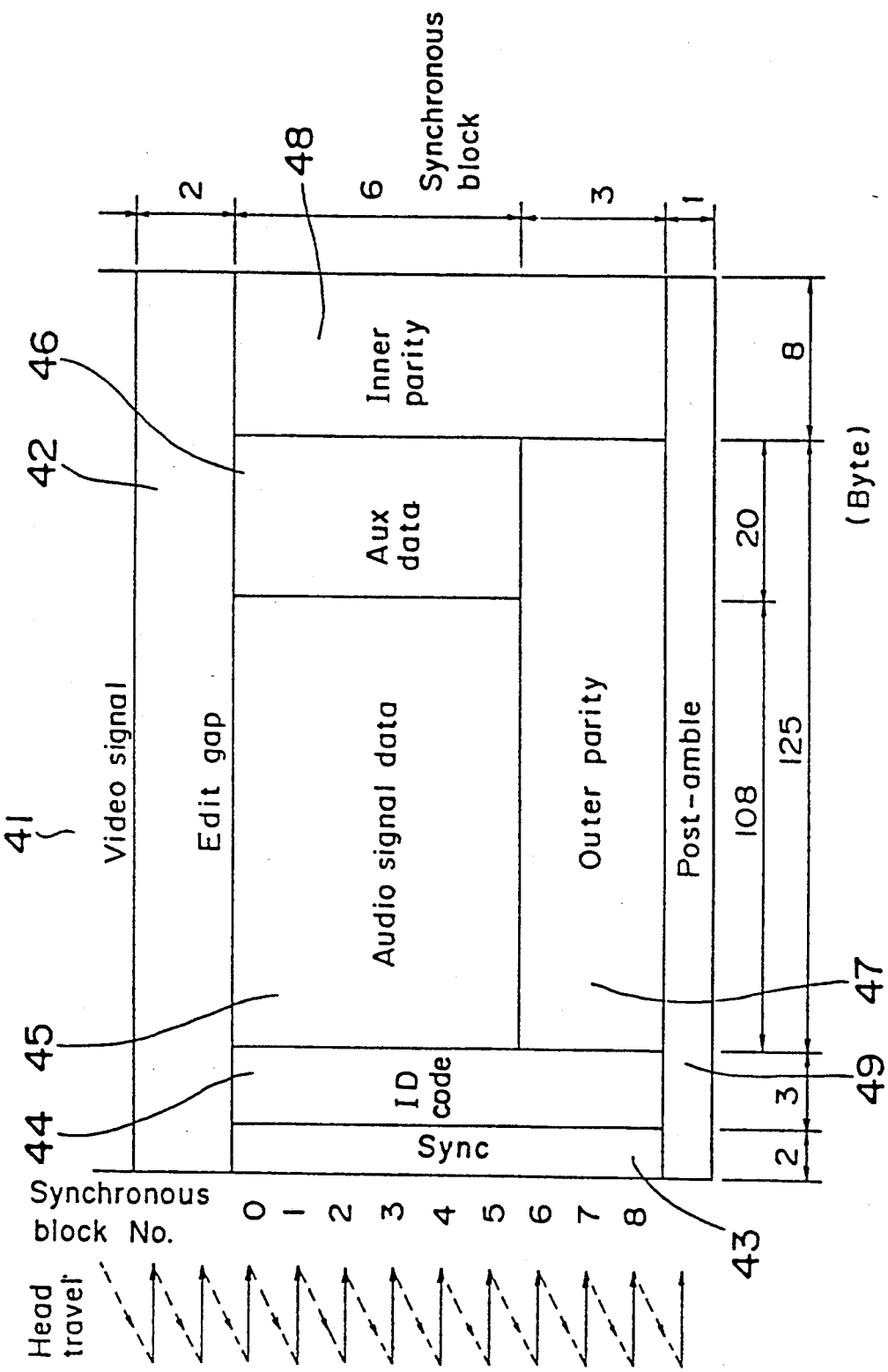
FIG. 5 is a view showing the structure of synchronous blocks in the recording track of FIG. 4.

Synchronous blocks in the vicinity of the audio signal portion 35 in each recording track 31 of FIG. 4 are described with reference to FIG. 5, hereinbelow. In FIG. 5, the synchronous blocks include a video signal portion 41, an edit gap 42, a synchronous signal 43, an ID code 44, an audio signal data portion 45, an auxiliary data portion 46, an outer parity 47, an inner parity 48 and a post-amble 49.

Hereinbelow, the recording method of the above described arrangement according to the third embodiment of the present invention is described. An audio signal portion provided between the edit gap 42 and the post-amble 49 includes 9 (K=9) synchronous blocks constituted by 6 (L=6<K) audio signal data portions 45 and 3 outer parities 47 as will be seen from synchronous block Nos. 0–5 and 6–8 shown at a left portion of FIG. 5, respectively. Each synchronous block is provided with the synchronous signal 43 for effecting synchronization at the time of reproduction, the ID code 44 including a block address, etc. and the inner parity 48 for correcting errors in the synchronous block. Inputted digital audio signals are written in the audio signal data portion 45 and necessary auxiliary data are written in the auxiliary data portion 46. Outer and inner parities are produced so as to be added and thus, a recording block is formulated. At this time, the auxiliary data portion 46 as a whole is disposed rearwards of the audio signal data portion 45, namely, an auxiliary data area of an identical capacity is added to an identical location in each synchronous block to which the audio signal is allotted.

As described above, the auxiliary data area of an identical capacity is added to an identical location in each synchronous block to which the audio signal is allotted in the third embodiment of the present invention. Thus, it becomes possible to scatter the auxiliary data. As a result, elimination of the auxiliary data reproduced even at the time of occurrence of defective synchronization can be lessened and the auxiliary data can be reproduced at high probability at the time of intermittent reproduction such as high-speed search, etc.

The auxiliary data portion 46 is not necessarily required to be disposed rearwards of the audio signal data portion 45 but may be disposed at the audio signal data portion 45 or forwards of the audio signal data portion 45. Meanwhile, it goes without saying that the same arrangement as that of the audio signal portion can be likewise applied to a video signal portion. Meanwhile, FIG. 5 shows the number of the synchronous blocks forming the respective portions and the number of bytes of the respective elements constituting the synchronous blocks by way of example. Therefore, the present invention is not restricted to these numbers. Furthermore, in the first to third embodiments of the present invention, the tape feed direction, head travel direction and inclination of the tracks are illustrated by way of example and thus, may be set arbitrarily.

Figure 6:
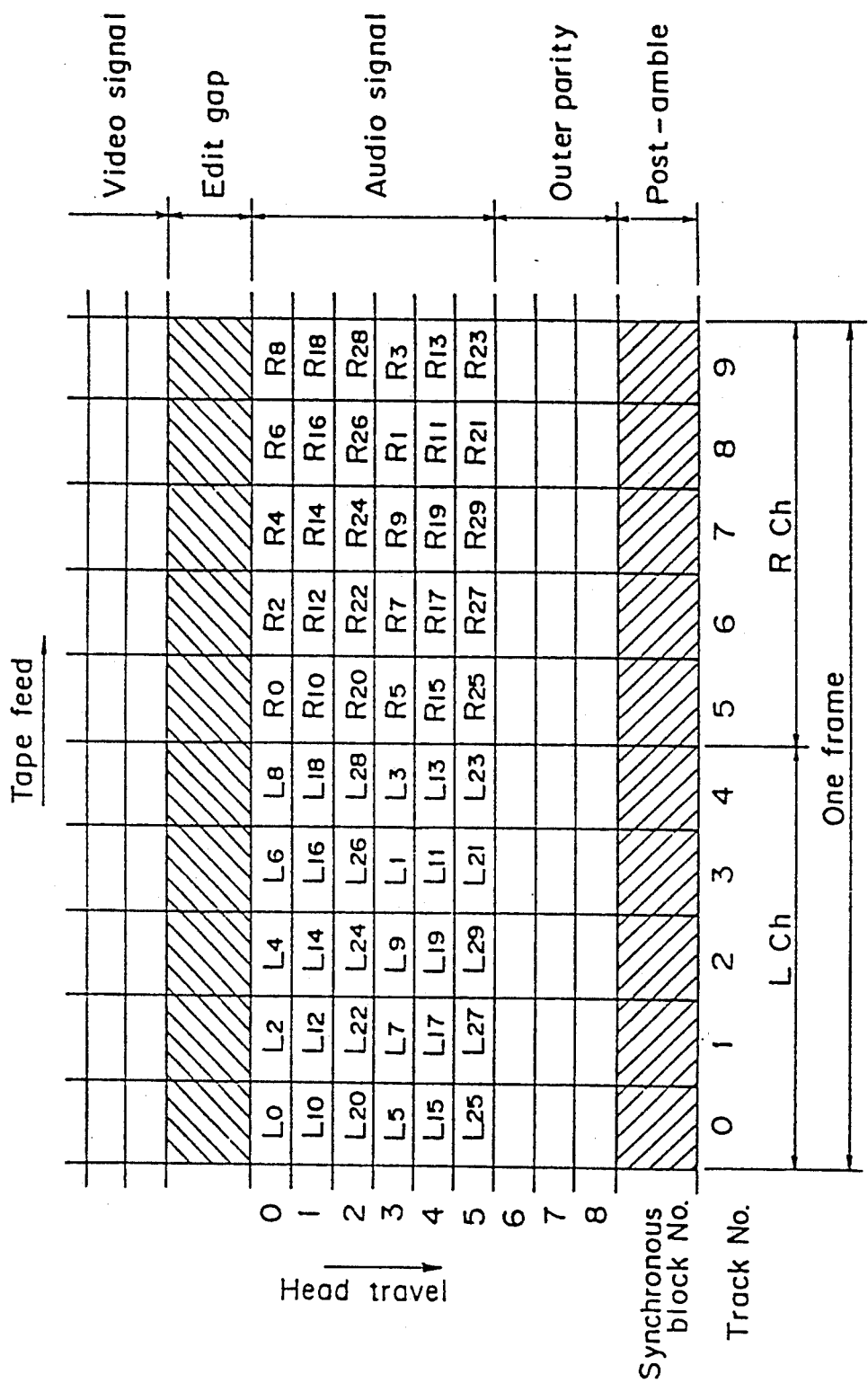
FIGS. 6 and 7 are views of structures of audio data blocks, showing an interleaving method in a recording method according to a fourth embodiment of the present invention.
Figure 7:
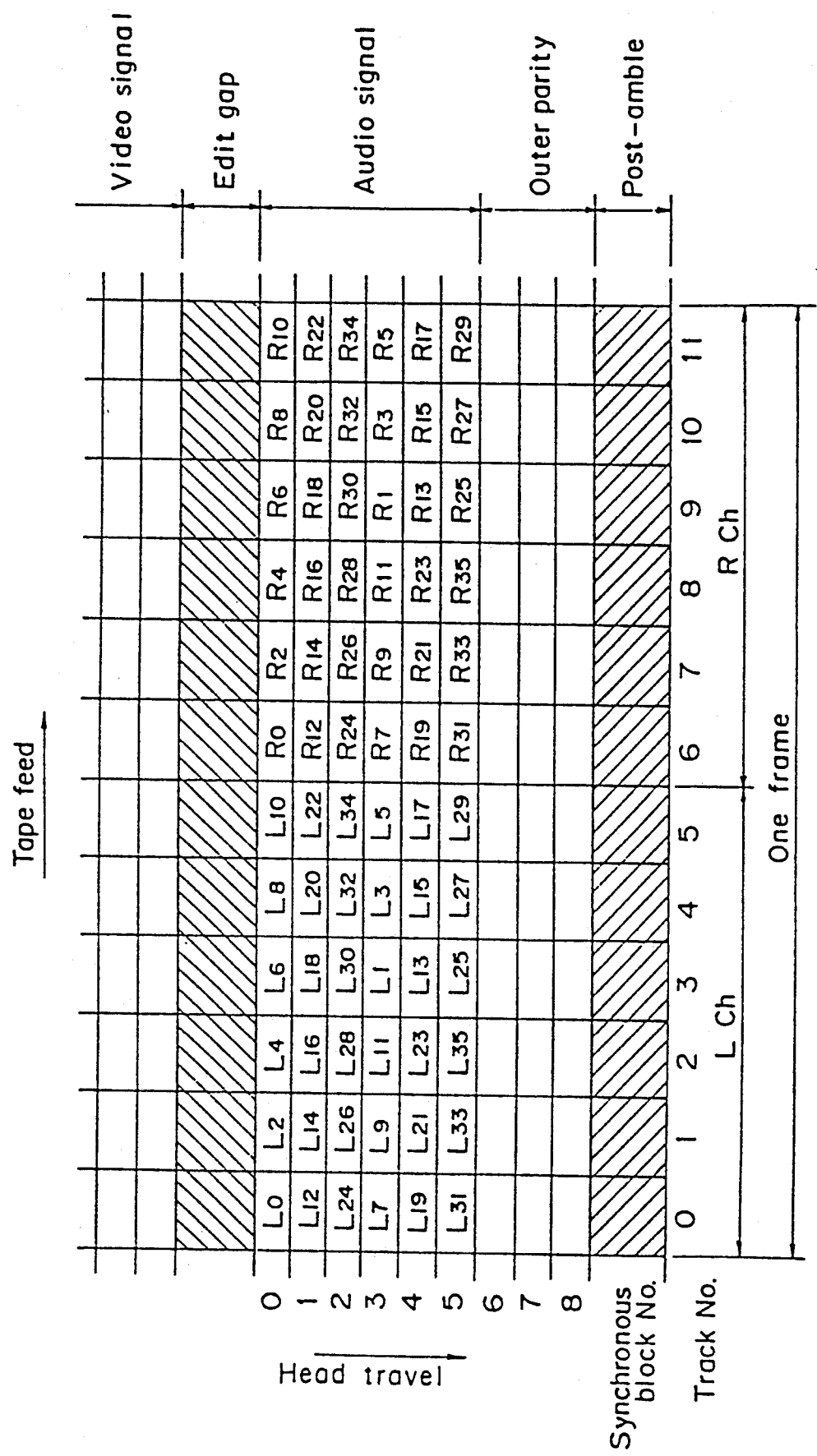

Hereinbelow, an interleaving method in an audio signal data portion in a recording method according to a fourth embodiment of the present invention is described with reference to FIGS. 6 and 7. FIGS. 6 and 7 show structures of audio data blocks and correspond to the 525 system and 625 system, respectively.

TABLE 1

| (Synchronous block No.) | 0 | 1 | 2 | 3 | 4 | 5 |
|---|---|---|---|---|---|---|
| Track 1 | 0 | 10 | 20 | 5 | 15 | 25 |
| Track 2 | 2 | 12 | 22 | 7 | 17 | 27 |
| Track 3 | 4 | 14 | 24 | 9 | 19 | 29 |
| Track 4 | 6 | 16 | 26 | 1 | 11 | 21 |
| Track 5 | 8 | 18 | 28 | 3 | 13 | 23 |

TABLE 2

| (Synchronous block No.) | 0 | 1 | 2 | 3 | 4 | 5 |
|---|---|---|---|---|---|---|
| Track 1 | 0 | 12 | 24 | 7 | 19 | 31 |
| Track 2 | 2 | 14 | 26 | 9 | 21 | 33 |
| Track 3 | 4 | 16 | 28 | 11 | 23 | 35 |
| Track 4 | 6 | 18 | 30 | 1 | 13 | 25 |
| Track 5 | 8 | 20 | 32 | 3 | 15 | 27 |
| Track 6 | 10 | 22 | 34 | 5 | 17 | 29 |

In FIGS. 6 and 7, initial values of time series sampling Nos. are, respectively, shown in Tables 1 and 2 above.

In FIG. 6, the lateral direction indicates track structure of audio signals corresponding to video signals of one frame. Track Nos. 0 to 4 correspond to L Ch of a stereophonic signal and track Nos. 5 to 9 correspond to R Ch of the stereophonic signal. In FIG. 6, the vertical direction indicates synchronous blocks. Roughly speaking, even series data are written in synchronous block Nos. 0 to 2, odd series data are written in synchronous block Nos. 3 to 5 and outer parities are written in synchronous block Nos. 6 to 8. Data of respective digital audio signals have initial values shown in FIG. 6 and thereafter, are written at a period of 30 samples in a sequence of sampling time series so as to be recorded on the tape through formation of the synchronous blocks.

An audio sample is recorded on a track 1 and the adjacent samples in sampling order of the sample are recorded on different tracks from the track 1 and adjacent tracks to the track 1. For example, in FIG. 6, a sample L4 is recorded on track 2 and samples L3 and L5 adjacent to the sample L4 are not recorded on track 2 or track 1 and track 3 which are adjacent to the track 2 on tape, respectively. (Samples L3 and L5 are recorded on track 4 and track 0, respectively.)

And in a group of tracks on which one channel audio samples during one frame are recorded, adjacent samples to a sample recorded on the first track of the group are not recorded on the last track of the group.

For example, in FIG. 6 a sample L10 is recorded on track 0 which is the first track of the group, and samples L9 and L11 which are adjacent to the sample L10 in sampling order are not recorded on the last track of the group (track 4). (Samples L9 and L11 are recorded on track 2 and track 3, respectively.)

FIG. 7 is similar to FIG. 6 but is different from FIG. 6 in that the number of tracks is increased to 12 and interleaving series is enlarged to a period of 36 samples in FIG. 7.

By employing the recording method of the above described arrangement, according to the fourth embodiment of the present invention, elimination of data by editing does not cause any audible degradation of the played back audio quality. Since the elimination is restricted to the tracks 0, 4 or 5, 9 in the 525 system and the tracks 0, 5 or 6, 11 in the 625 system in this invention, an erroneous sample has a longer distance from another erroneous sample and is interpolated naturally.

Figure 8:
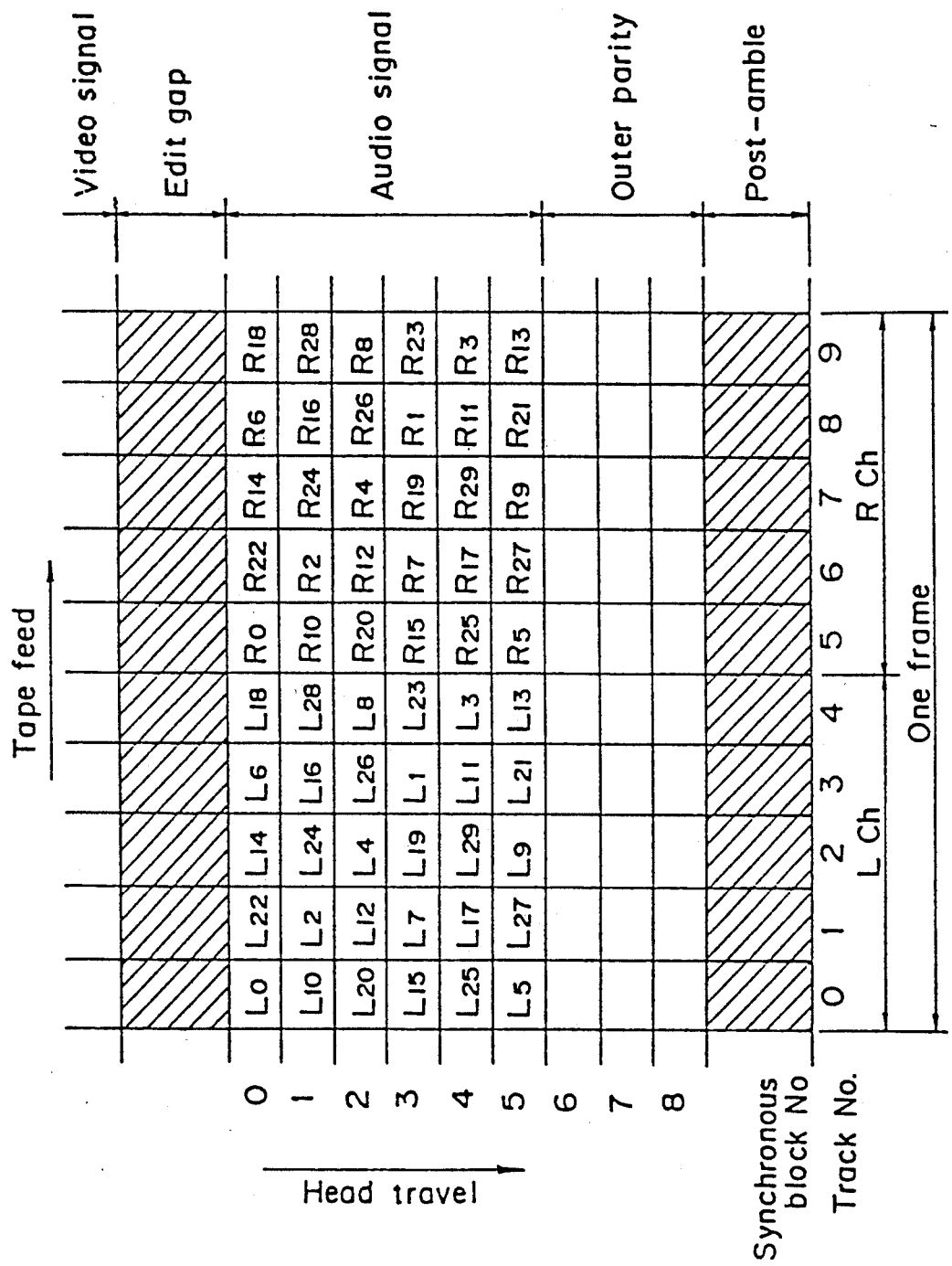
FIGS. 8 and 9 are views of structures of audio data blocks, showing an interleaving method in a recording method according to a fifth embodiment of the present invention.
Figure 9:
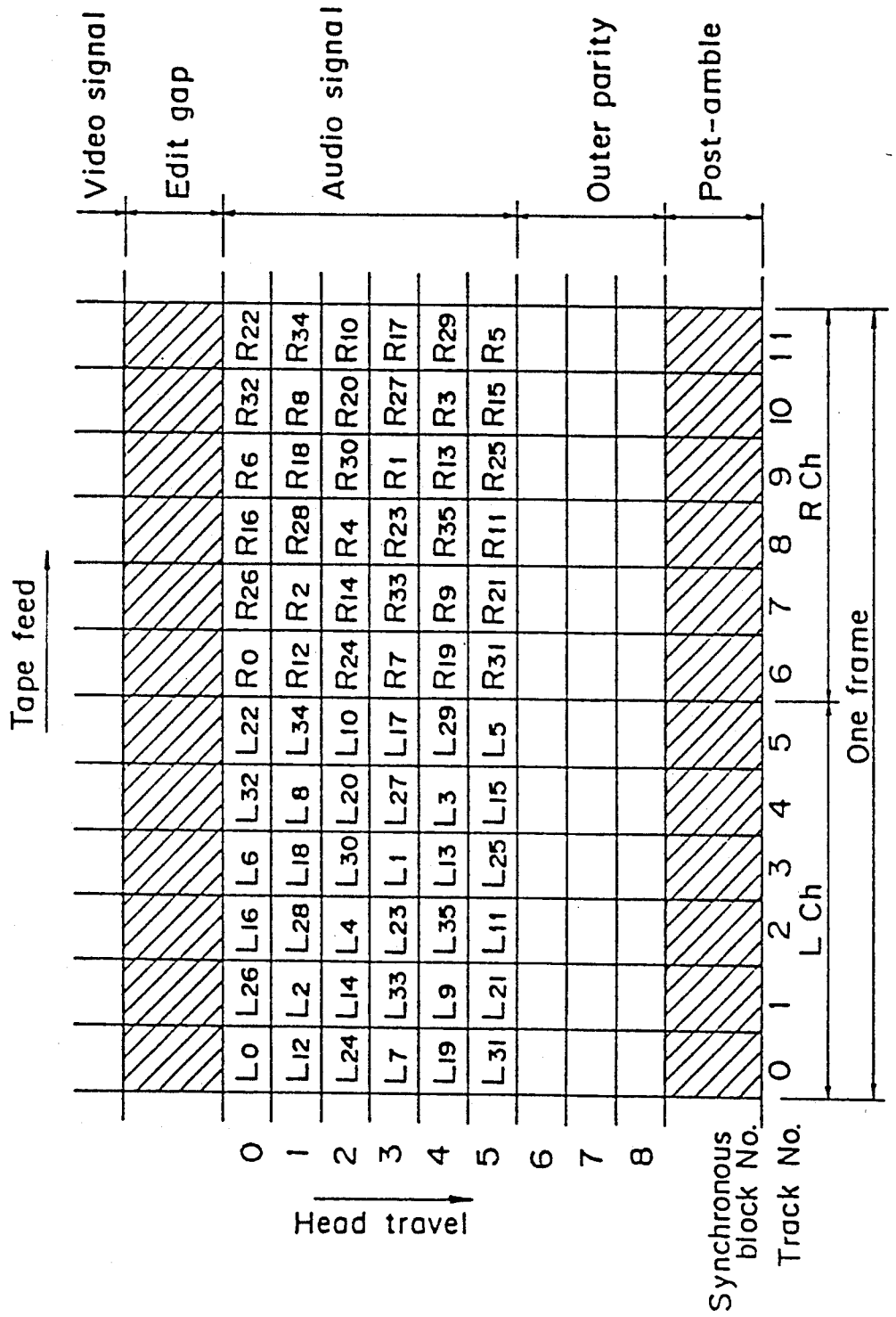

FIGS. 8 and 9 show structures of audio data blocks in a recording method according to a fifth embodiment of the present invention and correspond to the 525 system and 625 system, respectively. In FIGS. 8 and 9, initial values of time series sampling Nos. are, respectively, shown in Table 3 and 4 below.

TABLE 3

| (Synchronous block No.) | 0 | 1 | 2 | 3 | 4 | 5 |
|---|---|---|---|---|---|---|
| Track 1 | 0 | 10 | 20 | 15 | 25 | 5 |
| Track 2 | 22 | 2 | 12 | 7 | 17 | 27 |
| Track 3 | 14 | 24 | 4 | 19 | 29 | 9 |
| Track 4 | 6 | 16 | 26 | 1 | 11 | 21 |
| Track 5 | 18 | 28 | 8 | 23 | 3 | 13 |

TABLE 4

| (Synchronous block No.) | 0 | 1 | 2 | 3 | 4 | 5 |
|---|---|---|---|---|---|---|
| Track 1 | 0 | 12 | 24 | 7 | 19 | 31 |
| Track 2 | 26 | 2 | 14 | 33 | 9 | 21 |
| Track 3 | 16 | 28 | 4 | 23 | 35 | 11 |
| Track 4 | 6 | 18 | 30 | 1 | 13 | 25 |
| Track 5 | 32 | 8 | 20 | 27 | 3 | 15 |
| Track 6 | 22 | 34 | 10 | 17 | 29 | 5 |

The fifth embodiment of FIGS. 8 and 9 is basically similar to the fourth embodiment of FIGS. 6 and 7 and contents of data contained in an identical track of the fifth embodiment are the same as those of the fourth embodiment. The fifth embodiment is different from the fourth embodiment in that in the case of a recording apparatus in which scratches are readily produced on the tape in the tape feed direction, data array is rotated in data of odd series and data of even series independently of each other and for each track such that the capability of error correction is further enhanced in the fifth embodiment.

By the above described arrangement of the recording method of the fifth embodiment of the present invention, recording of digital audio signals has high capability of error correction even in the recording apparatus in which scratches are readily produced on the tape in the tape feed direction.

Then, a sixth embodiment of the present invention is described. In the case where video signals do not synchronize with digital audio signals, the number of samples of the audio data to be actually sampled during a period corresponding to I (I=integer) fields is not fixed. Accordingly, when digital audio signals which are not synchronous with video signals are recorded by using a rotary head having a rotational frequency synchronous with the video signals, the number of samples of the digital audio signals to be recorded during a period corresponding to I fields of the video signals is required to be controlled at a unit of I fields. To this end, not only audio data sampled actually during the period corresponding to I fields of the video signals but a value or a code indicative of the number of samples is recorded in the sixth embodiment of the present invention.

By the above described arrangement of the recording method, even the digital audio signals which are not synchronous with the video signals can be recorded synchronously with the video signals and can be reproduced at high precision by suppressing jitter of a sampling frequency at the time of reproduction. The auxiliary data portion 46 of FIG. 5 or another portion may be used as a portion for recording a value or a code indicative of the number of samples.

Figure 10:
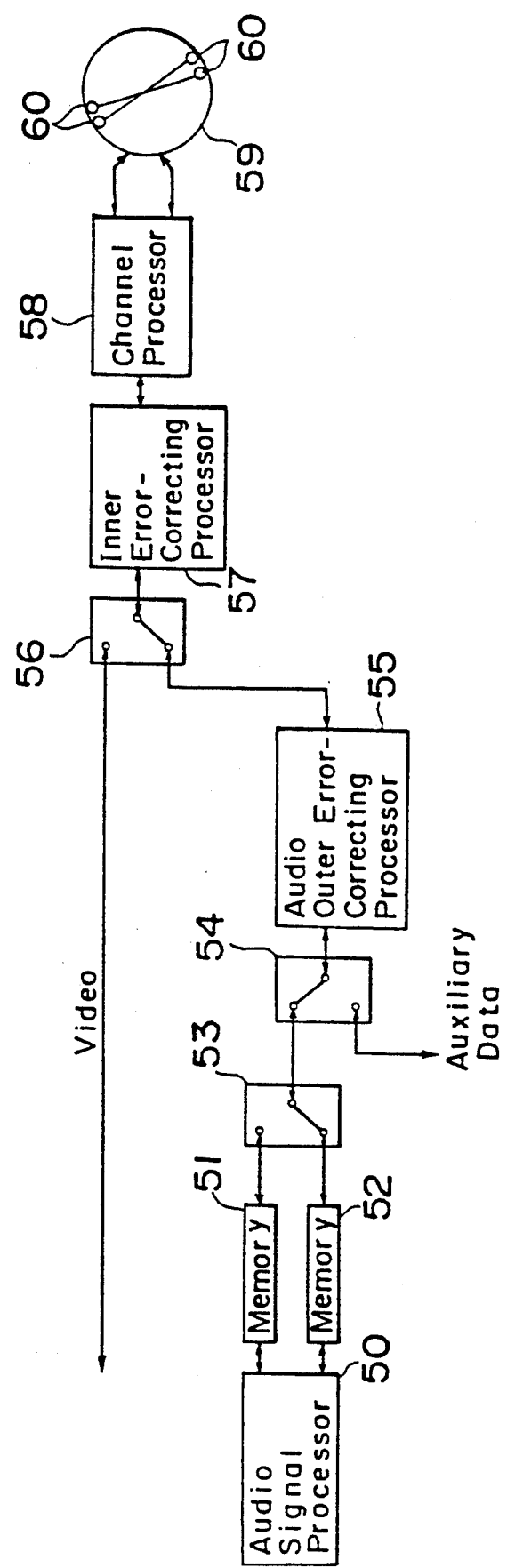
FIG. 10 is a block diagram of a circuit employed in the recording method of the present invention.

Finally, a circuit employed in a recording method according to a seventh embodiment of the present invention is described with reference to FIG. 10. FIG. 10 illustrates audio input of two channels but it goes without saying that the present invention is not restricted to 2-channel audio signals. In FIG. 10, an audio signal processor 50 digitizes audio input signals at the time of recording or processes digitized audio input signals. This processing includes a processing currently performed in general, in which over-sampled audio data are converted into sampled values of a predetermined frequency of, for example, 48 kHz. Memories 51 and 52 connected to a switch 53 store audio signals of channels "1" and "2", respectively and multiplex 2-channel audio signals sampled concurrently, by time sharing. Namely, at the time of recording, audio signals of channels "1" and "2" are, respectively, stored in the memories 51 and 52 at a frequency of 48 kHz. On the other hand, readout from the memories 51 and 52 is performed per 54 samples in the order of audio signals of channels "1" and "2". This read-out from the memories 51 and 52 is performed at a frequency for processing video signals, which is usually about several MHz. Meanwhile, for convenience of description, a time-sharing multiplex circuit is constituted by the memories 51 and 52 and the switch 53 in this embodiment. However, the memories 51 and 52 and the switch 53 may also be replaced by one memory.

In this state, audio signals stored during a fixed period, for example, a period of one frame of video signals are read out in a duration which is about one-hundredth of a period required for storage. Therefore, after necessary audio data have been read out, a blank period appears in which audio data do not exist up to read-out of the next audio data. A switch 54 is provided for inserting a small amount of auxiliary data at a time during this blank period.

An audio outer error-correcting processor 55 is provided for adding outer parities for audio data an auxiliary during the blank period. Meanwhile, a switch 56 is provided for inserting video data during the blank period. An inner error-correcting processor 57 adds inner parities to video signals, audio signals, auxiliary data and outer parities for audio signals, which appear at an output terminal of the switch 56.

Furthermore, by using a known technology, a channel processor 58 adds synchronous patterns and ID codes to the data having inner parities added thereto. As a result, the synchronous blocks in the recording track of FIG. 4 can be formulated. Subsequently, these data are converted into channel coding data suitable for characteristics of a recording and reproducing apparatus. Then, this channel coding data is recorded on the tape by magnetic heads 60 mounted on a cylinder 59. Thus, the recording format of FIG. 4 can be obtained in this embodiment.

At the time of reproduction, processing opposite to that of recording is performed. Namely, initially, the synchronous patterns in reproduction channel coding data read out from the magnetic heads 60 mounted on the cylinder 59 are detected so as to search for a head of the synchronous blocks such that the synchronous blocks are re-formed. Subsequently, after the ID codes and the synchronous patterns have been removed, errors in the synchronous blocks are corrected by using the inner parities. Then, after the video signals have been separated, errors in the audio signals are corrected by using the outer parities. Thereafter, the auxiliary data are separated and the time-sharing multiplex 2-channel audio signals are restored into audio signals of the two independent channels by using the memories 51 and 52.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a method of recording digital signals, in which all audio signals, which are comprised of audio samples, of N channels (N=integer>1) are recorded on M tracks (M=integer>N) where video signals of I fields (I=integer) are recorded, the improvement comprising:

the M tracks being divided into N track groups each having S tracks (S=integer=M/N) arranged successively such that the audio signals of a j-th channel (j=integer) in the N channels are recorded on the tracks of an i-th track group (i=integer) in the N track groups.

2. A method as claimed in claim 1, wherein in each of the track groups, recorded audio samples which are abutting in time sampled sequence are not disposed in the same track and neighboring tracks thereof.

3. A method as claimed in claim 2, wherein recorded audio samples which are disposed on the first track of each track group are not disposed in the last track thereof.

4. A method as claimed in claim 1, wherein each of the M tracks is divided into a video signal portion and an audio signal portion and the audio signal portion is divided into K synchronous blocks (K=integer) such that L synchronous blocks (L=integer<K) of the K synchronous blocks are allotted to audio signal data, with the remaining (K-L) synchronous blocks being allotted to error correction and check codes;

the L synchronous blocks, respectively, include areas for recording auxiliary data.

5. A method as claimed in claim 4, wherein I=2, M=10, N=2, K=9 and L=6 are adopted for the video signals of 525 system, while I=2, M=12, N=2, K=9 and L=6 are adopted for the video signals of 625 system.

6. A method as claimed in claim 5, wherein the audio signal data corresponding to the video signals of the I fields are sampled continuously in time series in an area of the L synchronous blocks in each of the S tracks and repeatedly at a period of L x S samples for the video signals of 525 system and at a period of L x S samples for the video signals of 625 system by employing values of Table 1 below and values of Table 2 below as initial values of time series sampling for the video signals of 525 system and the video signals of 625 system, respectively, whereby the audio signal data are recorded in an interleaved array;

TABLE 1

| (Synchronous block No.) | 0 | 1 | 2 | 3 | 4 | 5 |
|---|---|---|---|---|---|---|
| Track 1 | 0 | 10 | 20 | 5 | 15 | 25 |
| Track 2 | 2 | 12 | 22 | 7 | 17 | 27 |
| Track 3 | 4 | 14 | 24 | 9 | 19 | 29 |
| Track 4 | 6 | 16 | 26 | 1 | 11 | 21 |
| Track 5 | 8 | 18 | 28 | 3 | 13 | 23 |

TABLE 2

| (Synchronous block No.) | 0 | 1 | 2 | 3 | 4 | 5 |
|---|---|---|---|---|---|---|
| Track 1 | 0 | 12 | 24 | 7 | 19 | 31 |
| Track 2 | 2 | 14 | 26 | 9 | 21 | 33 |
| Track 3 | 4 | 16 | 28 | 11 | 23 | 35 |
| Track 4 | 6 | 18 | 30 | 1 | 13 | 25 |
| Track 5 | 8 | 20 | 32 | 3 | 15 | 27 |
| Track 6 | 10 | 22 | 34 | 5 | 17 | 29. |

7. A method as claimed in claim 6, wherein the audio signals are recorded asynchronously with respect to the video signals, and wherein the audio signals are divided by a period of the I fields of the video signals such that the number of samples is either rounded off or truncated to an integer;

wherein the audio signal sampled during the period of the I fields of the video signals are recorded together with a value indicative of the number of samples performed during the period of the I fields of the video signals.

8. A method as claimed in claim 7, wherein the value indicative of the number of samples performed during the period of the I fields of the video signals is recorded as the auxiliary data.

9. A method as claimed in claim 5, wherein the audio signal data corresponding to the video signals of I fields are sampled continuously in time series in an area of the L synchronous blocks in each of the S tracks and repeatedly at a period of L x S samples for the video signals of 525 system and at a period of L x S samples for the video signals of 625 system by employing values of Table 3 below and values of Table 4 below as initial values of time series sampling for the video signals of 525 system and the video signals of 625 system, respectively whereby the audio signal data are recorded in an interleaved array;

TABLE 3

| (Synchronous block No.) | 0 | 1 | 2 | 3 | 4 | 5 |
|---|---|---|---|---|---|---|
| Track 1 | 1 | 10 | 20 | 15 | 25 | 5 |
| Track 2 | 22 | 2 | 12 | 7 | 17 | 27 |
| Track 3 | 14 | 24 | 4 | 19 | 29 | 9 |
| Track 4 | 6 | 16 | 26 | 1 | 11 | 21 |
| Track 5 | 18 | 28 | 8 | 23 | 3 | 13 |

TABLE 4

| (Synchronous block No.) | 0 | 1 | 2 | 3 | 4 | 5 |
|---|---|---|---|---|---|---|
| Track 1 | 0 | 12 | 24 | 7 | 19 | 31 |
| Track 2 | 26 | 2 | 14 | 33 | 9 | 21 |
| Track 3 | 16 | 28 | 4 | 23 | 35 | 11 |
| Track 4 | 6 | 18 | 30 | 1 | 13 | 25 |
| Track 5 | 32 | 8 | 20 | 27 | 3 | 15 |
| Track 6 | 22 | 34 | 10 | 17 | 29 | 5. |

10. A method as claimed in claim 9, wherein audio signals are recorded asynchronously with respect to the video signals, and wherein the audio signals are divided by a period of the I fields of the video signals such that the number of samples are either rounded off or truncated to an integer;

and wherein the audio signals sampled during the period of the I fields of the video signals are recorded together with a value indicative of the number of samples performed during the period of the I fields of the video signals.

11. A method as claimed in claim 10, wherein the value indicative of the number of samples performed during the period of the I fields of the video signals is recorded as the auxiliary data.

12. A method as claimed in claim 4, wherein each of the L synchronous blocks has the same capacity for recording the auxiliary data, at an identical position in the synchronous block.

13. A method as claimed in claim 12, wherein I=2, M=10, N=2, K=9 and L=6 are adopted for the video signals of 525 system, while I=2, M=12, N=2, K=9 and L=6 are adopted for the video signals of 625 system.

14. A method as claimed in claim 13, wherein the audio signal data corresponding to the video signals of I fields are sampled continuously time series in an area of the L synchronous blocks in each of the S tracks and repeatedly at a period of L x S samples for the video signals of 525 system and at a period of L x S samples for the dvideio signals of 625 system by employing values of Table 1 below and values of Table 2 below as initial values of time series sampling for the video signals of 525 system and the video signals of 625 system, respectively whereby the audio signal data are recorded in an interleaved array;

TABLE 1

| (Synchronous block No.) | 0 | 1 | 2 | 3 | 4 | 5 |
|---|---|---|---|---|---|---|
| Track 1 | 0 | 10 | 20 | 5 | 15 | 25 |
| Track 2 | 2 | 12 | 22 | 7 | 17 | 27 |
| Track 3 | 4 | 14 | 24 | 9 | 19 | 29 |
| Track 4 | 6 | 16 | 26 | 1 | 11 | 21 |
| Track 5 | 8 | 18 | 28 | 3 | 13 | 23 |

TABLE 2

| (Synchronous block No.) | 0 | 1 | 2 | 3 | 4 | 5 |
|---|---|---|---|---|---|---|
| Track 1 | 0 | 12 | 24 | 7 | 19 | 31 |
| Track 2 | 2 | 14 | 26 | 9 | 21 | 33 |
| Track 3 | 4 | 16 | 28 | 11 | 23 | 35 |
| Track 4 | 6 | 18 | 30 | 1 | 13 | 25 |
| Track 5 | 8 | 20 | 32 | 3 | 15 | 27 |
| Track 6 | 10 | 22 | 34 | 5 | 17 | 29. |

15. A method as claimed in claim 14, wherein the audio signals are recorded asynchronously with respect to the video signals, and wherein the audio signals are divided by a period of the I fields of the video signals such that the number of samples is either rounded off or truncated to an integer;
   wherein the audio signals sampled during the period of the I fields of the video signals are recorded together with a value indicative of the number of samples performed during the period of the I fields of the video signals.

16. A method as claimed in claim 15, wherein the value indicative of the number of samples performed during the period of the I fields of the video signals is recorded as the auxiliary data.

17. A method as claimed in claim 13, wherein the audio signal data corresponding to the video signals of the I fields are sampled continuously in time series in an area of the L synchronous blocks in each of the S tracks and repeatedly at a period of L x S samples for the video signals of 525 system and at a period of L x S samples for the video signals of 625 system by employing values of Table 3 below and values of Table 4 below as initial values of time series sampling for the video signals of 525 system and the video signals of 625 system, respectively, whereby the audio signal data are recorded in an interleaved array;

TABLE 3

| (Synchronous block No.) | 0 | 1 | 2 | 3 | 4 | 5 |
|---|---|---|---|---|---|---|
| Track 1 | 0 | 10 | 20 | 15 | 25 | 5 |
| Track 2 | 22 | 2 | 12 | 7 | 17 | 27 |
| Track 3 | 14 | 24 | 4 | 19 | 29 | 9 |
| Track 4 | 6 | 16 | 26 | 1 | 11 | 21 |
| Track 5 | 18 | 28 | 8 | 23 | 3 | 13 |

TABLE 3

| (Synchronous block No.) | 0 | 1 | 2 | 3 | 4 | 5 |
|---|---|---|---|---|---|---|
| Track 1 | 1 | 10 | 20 | 15 | 25 | 5 |
| Track 2 | 22 | 2 | 12 | 7 | 17 | 27 |
| Track 3 | 14 | 24 | 4 | 19 | 29 | 9 |
| Track 4 | 6 | 16 | 26 | 1 | 11 | 21 |
| Track 5 | 18 | 28 | 8 | 23 | 3 | 13 |

18. A method as claimed in claim 17, wherein the audio signals are recorded asynchronously with respect to the video signals, the audio signals are divided by a period of the I fields of the video signals such that the number of samples is either rounded off or truncated to an integer;
   and wherein the audio signals sampled during the period of the I fields of the video signals are recorded together with a value indicative of the number of samples performed during the period of the I fields of the video signals.

19. A method as claimed in claim 18, wherein the value indicative of the number of samples performed during the period of the I fields of the video signals is recorded as the auxiliary data.

* * * * *